United States Patent [19]

Ingham

[11] Patent Number: 4,995,598
[45] Date of Patent: Feb. 26, 1991

[54] RESILIENT MOUNTING

[75] Inventor: Peter L. Ingham, Leamington SPA, England

[73] Assignee: Dunlop Limited, United Kingdom

[21] Appl. No.: 330,135

[22] Filed: Mar. 29, 1989

[30] Foreign Application Priority Data

Mar. 31, 1988 [GB] United Kingdom ............... 8807658
May 11, 1988 [GB] United Kingdom ............... 8811198

[51] Int. Cl.⁵ ............................................. F16F 7/00
[52] U.S. Cl. ................................... 267/293; 248/635; 267/294; 267/141.1
[58] Field of Search ............... 248/560, 632, 633, 634, 248/635, 638; 267/141.1, 141.2, 141.4, 294, 293

[56] References Cited

U.S. PATENT DOCUMENTS

| 2,208,532 | 7/1940 | Woodward | 248/635 |
| 2,869,811 | 1/1959 | Boschi | 267/141.4 |
| 3,266,139 | 8/1966 | Adams | 267/141.4 |
| 3,756,551 | 9/1973 | Bishop | 267/141.1 |
| 4,288,063 | 9/1981 | Brenner | 248/635 |

FOREIGN PATENT DOCUMENTS

| 0122184 | 10/1984 | European Pat. Off. | |
| 706612 | 4/1941 | Fed. Rep. of Germany . | |
| 3529199 | 2/1986 | Fed. Rep. of Germany | 248/560 |
| 3734910 | 9/1988 | Fed. Rep. of Germany | 267/141.1 |
| 829938 | 7/1938 | France . | |
| 1158530 | 1/1958 | France . | |
| 2141068 | 1/1973 | France . | |
| 649623 | 11/1962 | Italy | 248/632 |
| 18636 | 1/1985 | Japan | 248/638 |
| 493119 | 10/1938 | United Kingdom . | |

Primary Examiner—Ramon O. Ramirez
Assistant Examiner—Robert A. Olson
Attorney, Agent, or Firm—Stevens, Davis, Miller & Mosher

[57] ABSTRACT

A resilient mounting intended primarily to withstand compressive loading is of a tubular and interleaved construction comprising a pair of end plates and an intermediate annular plate which serves to stiffen a tubular elastomeric body provided between the end plates. A buffer member is secured to one of the end plates and extends longitudinally within the tubular body to lie normally free from contact with the tubular body. A protective cushioning layer provided between the buffer member and internal edge of the intermediate plate prevents direct contact between the buffer member and intermediate plate under transverse load.

7 Claims, 2 Drawing Sheets

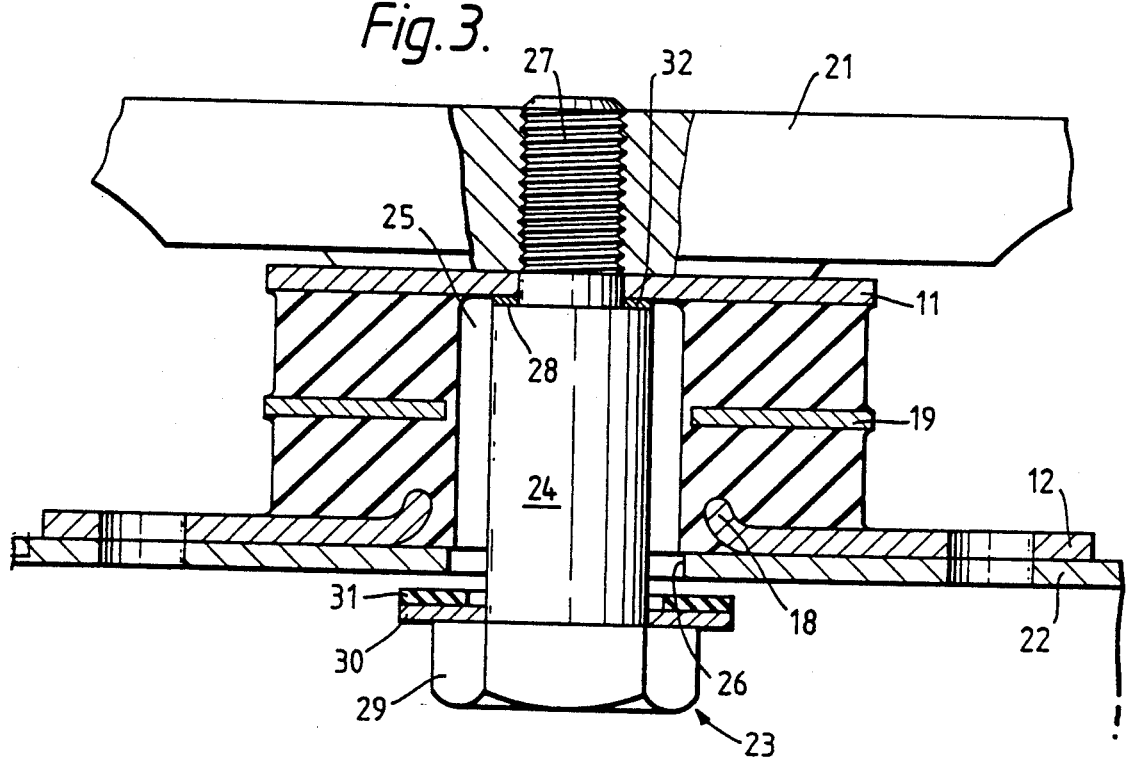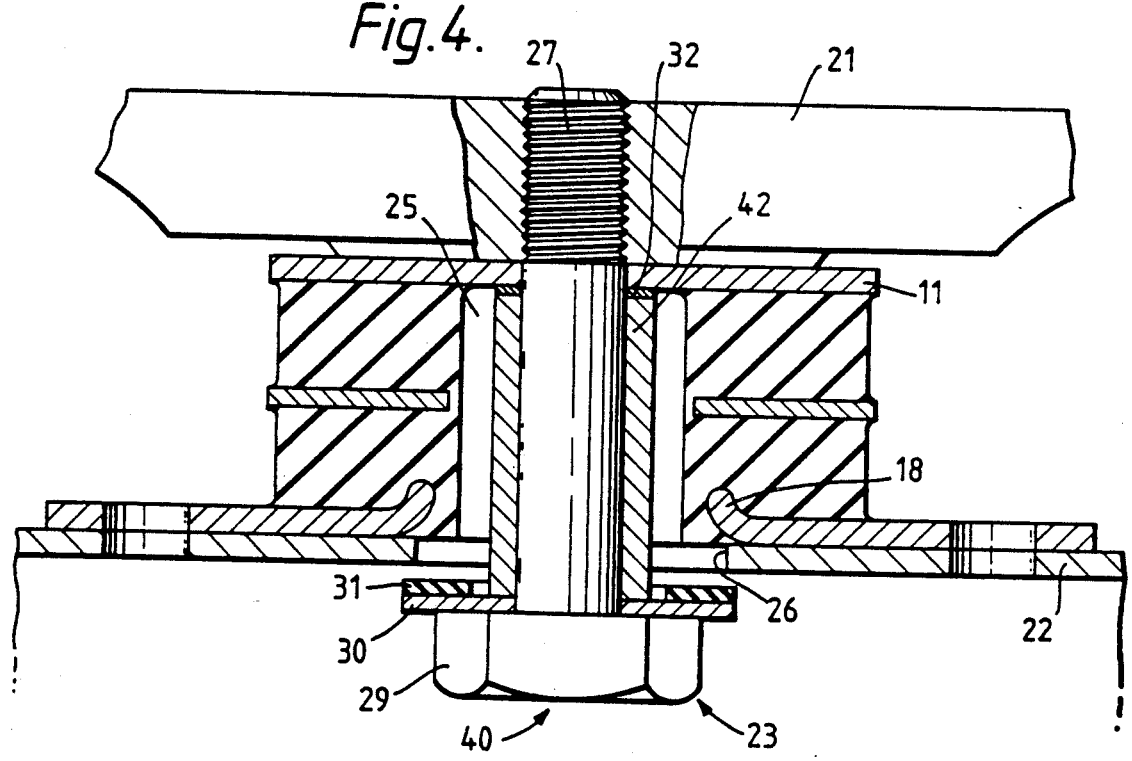

RESILIENT MOUNTING

This invention relates to a resilient mounting and to an assembly of two components resiliently interconnected by the resilient mounting of the invention.

The invention is directed in particular, though not exclusively, to a resilient mounting able to withstand high compression load with low deflection in a first, longitudinal direction and to exhibit a relatively low stiffness in a second, transverse direction perpendicular to said first direction. Typically the mounting is orientated with the first, longitudinal direction lying vertically and with the second, transverse direction therefore lying horizontally.

In accordance with one of its aspects the present invention provides a resilient mounting comprising a resilient component comprising a substantially tubular body of elastomeric material located between and bonded to generally planar confronting surfaces of a pair of end members, said body of elastomeric material being reinforced by an embedded annular reinforcement element of generally planar form arranged to lie between and substantially parallel with said confronting surfaces of the end members, a buffer member located within the internal cavity defined by the tubular body and secured to one of said end members, and a layer of elastomeric material provided between at least the reinforcement element and buffer member to prevent direct contact between said element and member when the mounting is subject to transverse load.

The elastomeric material of the tubular body may extend over the inner edge of the annular reinforcement element, and if an end member is also of annular form the elastomeric material may extend over the inner edge of that member. The elastomeric material therefore is able to act as a cushion layer and prevent the buffer member provided within the internal cavity of the tubular body from coming into direct contact with the reinforcement element or an annular end member when the mounting is subjected to transverse loading.

Preferably a layer of elastomeric material is provided to prevent direct contact between the buffer member and annular reinforcement element. If the buffer member extends through an annular end member in an arrangement in which it is normally spaced therefrom in the absence of applied load, a layer of elastomeric material, which may be the same as a layer between the buffer member and reinforcement element, may be provided to prevent direct contact between the buffer member and end member.

Said layer of elastomeric material may be comprised by a sleeve of elastomeric material carried by the buffer member but preferably it is comprised by the elastomeric material of the tubular body arranged to extend over an inner edge of the reinforcement member and/or an annular end member.

The buffer member may be comprised by attachment means, such as a bolt, provided for example for attachment of one of the end members to one of two components to be interconnected by the resilient mounting of the present invention.

Preferably the attachment means is comprised by a bolt of stepped diameter, a first portion of larger diameter being arranged in the internal cavity and a second portion of reduced diameter extending through a central aperture in one of the end members and being screw-threaded over part of its length to facilitate attachment to one of two components to be interconnected. An annular shoulder defined by a step in diameter between the first and second portions may be arranged to engage the periphery of the central aperture in said one of the end members whereby said end member may be clamped to said one of the two components by the attachment means. Alternatively the attachment means may be comprised by an essentially equivalent arrangement of, say, a conventional bolt of substantially uniform diameter surrounded over part of its length by a rigid sleeve.

The other of the end members also may be apertured so that the bolt or other attachment means may extend therethrough with a head portion lying outside the internal cavity. In such an arrangement an inner face of the head portion may be used to act as an axial stop to limit axial extension of the resilient mounting in said first direction. In an assembled condition the inner face of the head portion may confront the other of said end members or one of the interconnected components; one of the confronting surfaces of the head portion and end member or interconnected component may be provided with a cushion layer of elastomeric material to prevent direct contact of said confronting surfaces.

The tubular body of elastomeric material may be provided with more than one embedded reinforcement element. The or each reinforcement element typically is an annular steel plate but other materials such as glass or woven fabric may be employed. Preferably the or each reinforcement element has a cross-sectional shape and dimensions corresponding to those of the adjacent elastomeric material in which it is embedded apart from its inner edge which must be spaced from the internal cavity of the tubular body so that the elastomeric material may extend over said inner edge to act as a cushion layer.

It is envisaged that for most applications the tubular body of elastomeric material will be of a cylindrical form having substantially cylindrically shaped inner and outer surfaces; in this case any buffer member provided within the internal cavity of the tubular body also may have a cylindrical shape. In consequence the resulting resilient mounting, and an assembly incorporating said resilient mounting, will have substantially uniform load deflection characteristics in all transverse directions. Especially if the transverse load deflection characteristic is to vary with direction, the elastomeric material of the tubular body may depart from an internal cylindrical shape-it may for example be oval in cross-section. The buffer surface of any buffer member provided within the internal cavity also may depart from a cylindrical shape depending on the internal profile of the tubular elastomeric body and whether or not a uniform extent of unbuffered deflection is to be allowed in all transverse directions.

The end members may be formed from a substantially rigid metallic material but other materials such as plastics may be employed.

Two embodiments of the present invention will now be described, by way of example, with reference to the accompanying diagrammatic drawings in which:

FIG. 3 is a sectional view of a resilient mounting assembly incorporating the component part of FIGS. 1 and 2, and FIG. 4 is a view similar to that of FIG. 3 of a resilient mounting assembly in accordance with another embodiment of the present invention.

Figure 1:
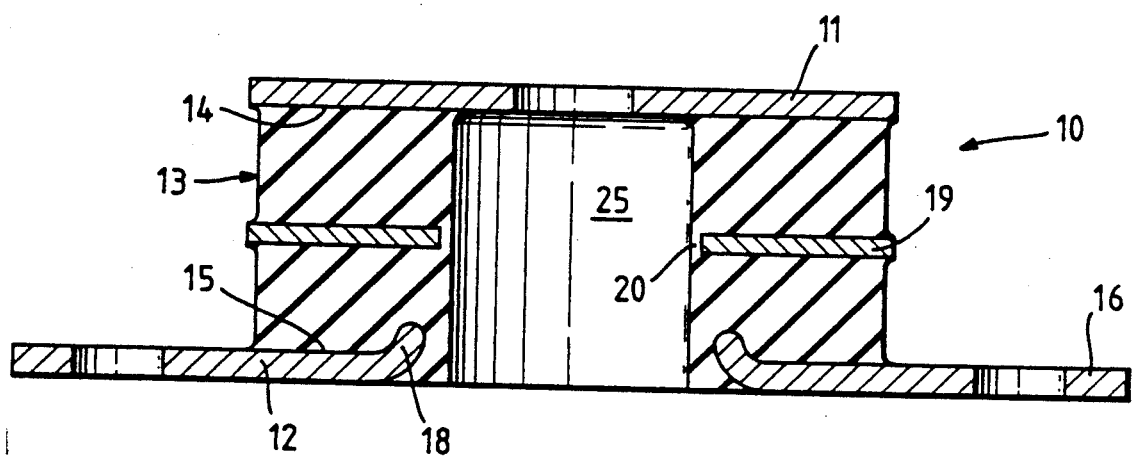
FIG. 1 is a sectional view of a component part of a resilient mounting in accordance with one embodiment of the present invention.

A component part 10 (shown in FIG. 1) of a resilient mounting comprises an upper rigid metal end member 11, a lower rigid metal end member 12 and a cylindrical tubular body 13 of elastomeric material, such as natural rubber, bonded between confronting surfaces 14, 15 of said end members.

The upper end member is of an annular form having an outer diameter corresponding to the outer diameter of the tubular body 13. It has an internal diameter significantly less than the internal diameter of the tubular body, in particular in the order of one half that of the internal diameter of the tubular body, for the purpose described below.

Figure 2:
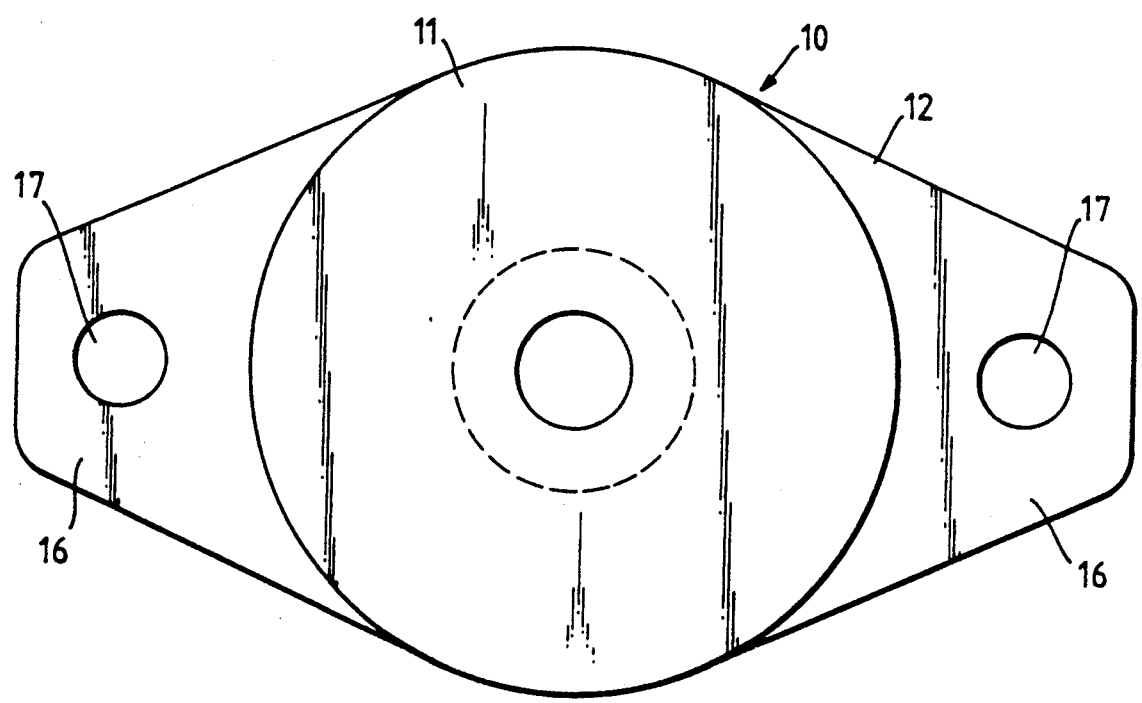
FIG. 2 is a plan view of the component part shown in FIG. 1.

The lower end member has a profiled outer shape as shown in FIG. 2 and which comprises a pair of flanged regions 16 each having an aperture 17 to facilitate attachment of that end member to one of two components to be interconnected by the resilient mounting. The lower end member has a central aperture 18 the diameter of which is slightly greater than that of the internal diameter of the tubular body as shown in FIG. 1. The material of the plate surrounding the aperture is turned upwards as also shown in FIG. 1 so that the inner edge of the plate is wholly embedded in the elastomeric material. Thus a cushioning layer of elastomeric material lies between the radially inner edge of the plate 12 and the bore of the tubular body 13.

The tubular body 13 has embedded therein, mid-way between its ends, a single annular metal reinforcing plate 19. The outer diameter of the plate corresponds substantially with the outer diameter of the tubular body 13 but the internal diameter of the annular plate is greater than the internal diameter of the body whereby the inner edge of the plate is covered by a cushioning layer 20 of the elastomeric material of the body 13 without the internal surface of that body needing to depart from a straight profile as considered in the longitudinal cross-section of FIG. 1.

In use of the resilient mounting to support the weight of an engine the end members 11, 12 of the component part 10 are disposed generally horizontally and connected respectively to two components, an engine support bracket 21 and a vehicle cross member 22 to be interconnected by the mounting.

The lower member 12 is bolted directly to the cross member 22 by means of bolts (not shown) extending through the apertures 17.

The upper member 11 is secured to the engine support bracket 21 by an attachment component which in combination with the component part 10 forms the resilient mounting. The attachment component is in the form of a specially profiled bolt 23 which in the mounting additionally serves as an overload buffer.

The bolt 23 has a first body portion 24 which lies within the internal cavity 25 of the tubular body 13 and extends downwards therefrom, as viewed in FIG. 3, through the lower plate aperture 18 and a corresponding aperture 26 in the vehicle cross member 22. The diameter of the portion 24 lies substantially mid-way between the internal diameter of the upper plate 11 and the internal diameter of the tubular body 13.

A second body portion 27 extends upwardly from the first portion 24, as viewed in FIG. 3, and is screw-threaded for engagement with the engine support bracket 21. The second body portion is a close fit in the aperture of the upper member 11, and the shoulder region 28 at the step in diameter between the first and second portions 24, 27 engages a shim 32 which bears against the portion of the face 14 surrounding the aperture; in consequence the shoulder region serves to clamp the upper member 11 to the engine support bracket 21.

A head portion 29 extends from the lower end of the first body portion 24 of the bolt and a washer 30 secured to the head portion, for example by welding, supports an annular rubber buffer 31. The buffer 31 is positioned so as to be spaced slightly from a confronting surface of the vehicle cross member 22 when in an unloaded condition as shown in FIG. 3. In the event of the resilient mounting being subject to a tensile loading the buffer 31 acts as an axial buffer which engages the cross member before damaging tensile loads are experienced by the tubular elastomeric body 13.

Relative transverse movement of the engine support bracket and vehicle cross member normally is accommodated by the reinforced elastomeric tubular body 13 which is readily able to deform by shear in said transverse direction. Excess relative movement is restrained by engagement of the cylindrical internal surface of the tubular body with the first body portion 24 of the attachment bolt 23, the material of the tubular body cushioning the buffer from direct contact with the plates 12, 19. To ensure good operation of the annular buffer 31 for vertical rebound control when the resilient mounting is subject to high transverse deflection the diameter of aperture 26 in the cross member 22 is greater than that of the internal diameter of the tubular body 13.

In a modified embodiment of the invention, not illustrated, the upper member 11 of FIG. 3 may be spaced from member 21 by the base portion of an inverted cup having a downwardly and outwardly extending skirt portion depending from that base portion to act as an oil shield and protect the elastomeric material from possible contamination.

In a second embodiment of the invention, shown in FIG. 4, a resilient mounting comprises a component part 10 as shown in FIG. 1 arranged in combination with a buffer member 40 of modified form. In FIG. 4 parts which correspond with parts shown in FIG. 3 bear like reference numerals. The buffer member 40 corresponds with that shown in FIG. 3 except that the metal portion 24 of buffer 21 is replaced by a metal portion 41 of smaller diameter, and is surrounded by a steel sleeve 42. The outer diameter of the sleeve 42 corresponds with the outer diameter of the portion 24.

An upper end of the sleeve 42 bears against shim 32 and the lower end bears against the washer 30 associated with the axial buffer 31. In the resulting construction as illustrated, tightening of the screw-threaded bolt portion 27 in the engine support bracket 21 results in clamping together of the axial buffer 31, sleeve 42, shim 32 and upper end member 11 between the bolt head portion 29 and the support bracket 21. Because of this clamping action it is not necessary to weld or otherwise additionally secure the axial buffer relative to the bolt head portion 29.

I claim:

1. A resilient mounting comprising:

a resilient component comprising a substantially tubular body of elastomeric material located between and bonded to generally planar confronting surfaces of a pair of end members, said body of elastomeric material being reinforced by an embedded annular reinforcement element of generally planar form arranged to lie between and substantially parallel with said confronting surfaces of the end members, and a first of said end members being of an annular form, a bummer member secured to a second of said members and located within the internal cavity defined by the tubular body to lie spaced from the internal surface of the tubular body when the mounting is an unstressed condition, said buffer member extending axially over substantially the entire length of said internal cavity, and a buffer layer of elastomeric material provided between at least the buffer member and each of the reinforcement element and said first end member to prevent direct contact therebetween when the mounting is subject to transverse load.

2. A resilient mounting according to claim 1 wherein said elastomeric material of the tubular body is arranged to extend over the inner edge of the annular reinforcement element thereby to act as said buffer layer to prevent direct contact of the reinforcement element with the buffer member when the mounting is subject to transverse load.

3. A resilient mounting according to claim 1 wherein one of said end members is an annular member and the elastomeric material of the tubular body is arranged to extend over the inner edge of that member.

4. A resilient mounting according to claim 1 wherein as considered in longitudinal cross-section the internal surface of the tubular body is straight.

5. A resilient mounting according to claim 4 wherein the internal surface of the tubular body has a cylindrical shape.

6. A resilient mounting according to claim 1 wherein the buffer member comprises a head portion lying externally of the internal cavity, said head portion being provided with axial buffer means to restrict longitudinal extension of the tubular body.

7. A resilient mounting according to claim 6 wherein the buffer member comprises a sleeve of rigid material clamped between said head portion and said one of said end members and arranged as a buffer surface which confronts the bore of the tubular body.

* * * * *